Patented Mar. 15, 1927.

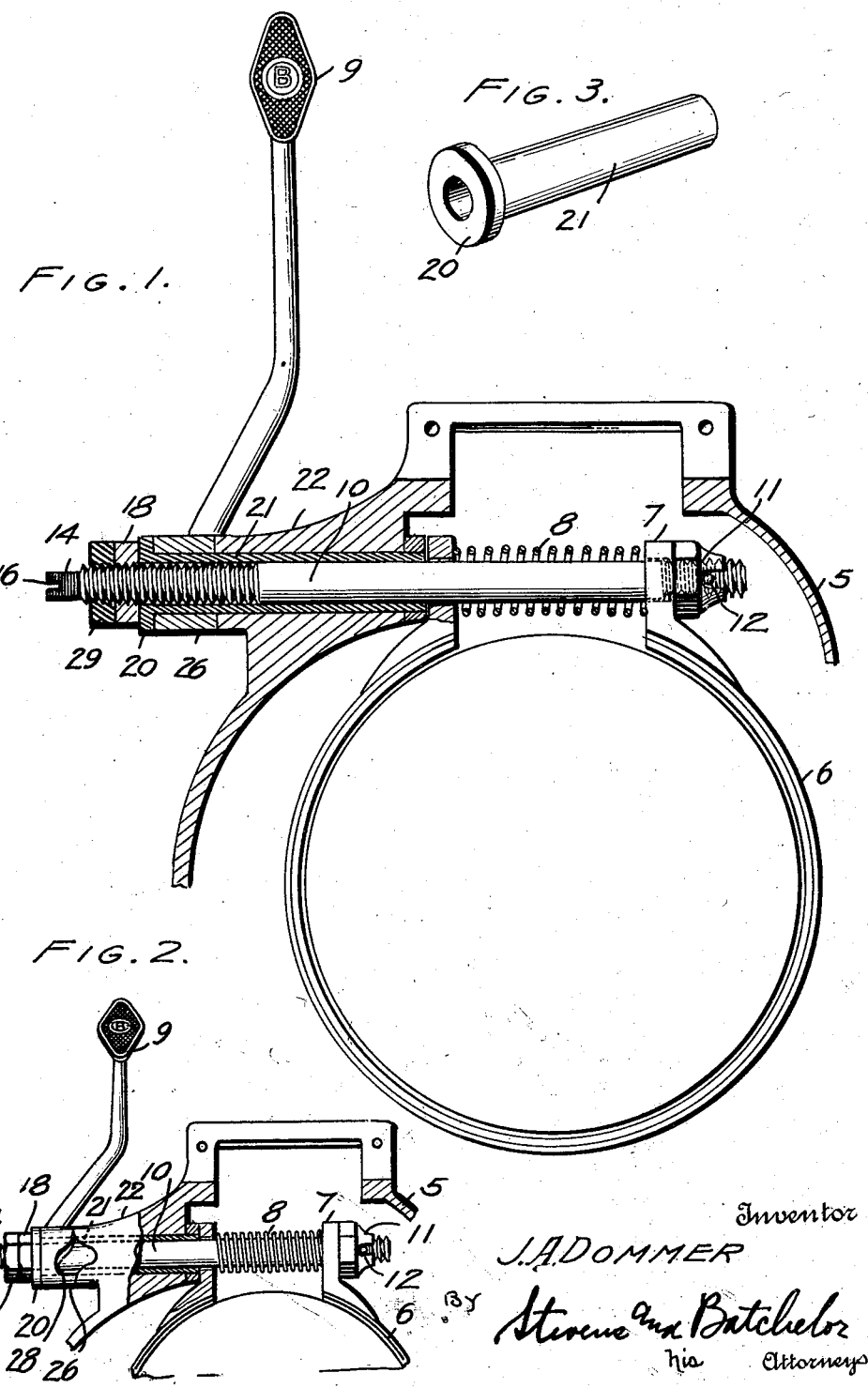

1,621,004

UNITED STATES PATENT OFFICE.

JOHN A. DOMMER, OF EUCLID, OHIO.

BRAKE-BAND-ADJUSTING DEVICE.

Application filed August 4, 1925. Serial No. 48,157.

This invention relates to brake band adjusting devices especially adapted for use on Ford transmissions.

One of the objects of this invention is to provide simple means whereby the bands may be occasionally adjusted from a point exteriorly of the transmission so that when it is desired to make an adjustment it is not necessary to remove the inspection plate. It will thus be seen that a brake band adjusting device constructed in accordance with this invention may be adjusted from time to time as the occasion requires by one having little or no mechanical experience.

Also, an important aim of this invention is to provide a brake band adjusting device which may be incorporated in a standard transmission without materially altering the construction or design thereof.

Another object of this invention is to provide a brake band adjusting device which is of highly simplified construction, durable in use, and cheap to manufacture.

Other objects and advantages will be apparent during the course of the following description.

In the accompanying drawing forming a part of this application and in which like numerals are employed to designate like parts throughout the same, Figure 1 is a vertical sectional view through the improved brake band adjusting device applied, the band being shown in its expanded position;

Fig. 2 is a side elevation of the improved brake band adjusting device, parts being broken away, and the band being shown contracted;

Fig. 3 is a perspective of a bushing embodied in the invention.

In the drawing, wherein for the purpose of illustration is shown a preferred embodiment of the invention, the numeral 5 designates a Ford automobile transmission housing, within which bands 6 of the usual number and size are located. It is well known that the bands 6 are adapted to be tightly gripped about the transmission drums for changing the ratio between the engine and the driving wheels; for changing the direction of travel of the driving wheels, or for bringing about a braking action. The bands 6 may be provided with ears 7 riveted thereto or detachable in accordance with the latest practice. A spring 8 is located between the ears 7 and during that time when there is no foot pressure on the pedal 9 the spring 8 will hold the band in its expanded position.

Fig. 1 illustrates that a shaft 10 is extended through the ears 7 and the spring and has its inner end provided with a castellated nut 11 securely held in place by means of a cotter key 12. The addition of the improved adjusting mechanism overcomes the need of periodically turning the nut 11 and thus it is proposed to lock the same in place on the shaft 10 by means of the cotter key just described.

The shaft 10 is substantially longer than the shaft ordinarily employed for adjusting the bands and has its outer end squared as indicated at 14 for engagement with the jaws of a wrench or the like. In addition to this the squared outer end of the shaft may be provided with a transverse notch 16 for the reception of a screw driver by means of which the shaft may be securely held against turning during the adjustment of a nut 18. The nut 18, which is threaded on the shaft 10, is engaged with the flanged outer end 20 of a bushing 21. The bushing 21 extends through the boss 22 of the transmission cover and rotatably supports the shaft 10 with a minimum of friction.

The pedal 9 is provided with a hub 26 rotatably mounted on the bushing 21 and having the usual cam edge or member 28 which coacts with a similar cam edge on the boss 22 whereby the depression of the pedal 9 results in the transverse movement of the hub 26. When the hub 26 is thus moved transversely the flange 20 will be moved in the same direction and the shaft 10 will be moved lengthwise for contracting the band. In carrying out the invention a lock nut 29 is threaded on the shaft 10 immediately behind the nut 18 and is adapted to be tightly engaged with the nut 18 to hold the same against loosening when the latter is finally adjusted.

It will be apparent that the bushing 21 supports the shaft 10 for rotation and at the same time extends beyond the boss 22 for rotatably supporting the hub 26. This arrangement greatly expedites the original assembling of the parts and provides a construction which is easily maintained, adjusted, or repaired as the occasion requires. The employment of the improved adjusting device makes it unnecessary to remove the inspection plate when it is desired to tighten or loosen the bands. Particular attention is directed to the fact that the operator may hold a screw driver or other tool in one hand and thereby hold the shaft 10 against turning, while a wrench is held in the other hand of the operator to advance the nut 18. This greatly expedites the tightening of the bands as both hands of the operator are reasonably close together and at the same time do not conflict.

The invention forming the subject matter of this application is capable of a wide variety of mechanical expressions and it is, therefore, to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:

1. The combination of a transmission cover having a boss, a bushing of elongated formation extended through the boss and having the outer end thereof provided with an annular flange, a pedal having a hub rotatably mounted on the bushing between said boss and said flange, a shaft rotatably extending through said bushing and terminating beyond opposite ends of the same, and a nut threaded on said shaft and engaged with said annular flange of the bushing.

2. The combination of a transmission cover having a boss, a bushing of elongated formation extended through the boss and having the outer end thereof provided with an annular flange, a pedal having a hub rotatably mounted on the bushing between said boss and said flange, a shaft rotatably extending through said bushing and terminating beyond opposite ends of the same, and a nut threaded on said shaft and engaged with said annular flange of the bushing, the outer portion of said shaft being squared for engagement by a wrench whereby a wrench in one hand of the operator may be employed to hold the shaft against turning while a wrench in the other hand of the operator may be employed to adjust said nut, said squared end of the shaft being adjacent said nut whereby both hands of the operator are close together.

3. The combination of a transmission cover having a boss, a bushing of elongated formation extended through the boss and having the outer end thereof provided with an annular flange, a pedal having a hub rotatably mounted on the bushing between said boss and said flange, a shaft rotatably extending through said bushing and terminating beyond opposite ends of the same, a nut threaded on said shaft and engaged with said annular flange of the bushing, the outer portion of said shaft being squared for engagement by a wrench whereby a wrench in one hand of the operator may be employed to hold the shaft against turning while a wrench in the other hand of the operator may be employed to adjust said nut, said squared end of the shaft being adjacent said nut whereby both hands of the operator are close together, and a lock nut threaded on said shaft outwardly of said first-named nut.

4. The combination of a transmission cover having a boss, a bushing of elongated formation extended through the boss and having the outer end thereof provided with an annular flange, a pedal having a hub rotatably mounted on the bushing between said boss and said flange, a shaft rotatably extending through said bushing and terminating beyond opposite ends of the same, a nut threaded on said shaft and engaged with said annular flange of the bushing, the outer portion of said shaft being squared for engagement by a wrench whereby a wrench in one hand of the operator may be employed to hold the shaft against turning while a wrench in the other hand of the operator may be employed to adjust said nut, said squared end of the shaft being adjacent said nut whereby both hands of the operator are close together, a lock nut threaded on said shaft outwardly of said first-named nut, and a castellated nut threaded on the inner end of said shaft, there being means to hold the castellated nut against turning.

In testimony whereof I affix my signature.

JOHN A. DOMMER.